Jan. 4, 1949.   T. A. PURVIS   2,458,300
RESILIENT WHEEL
Filed May 22, 1944
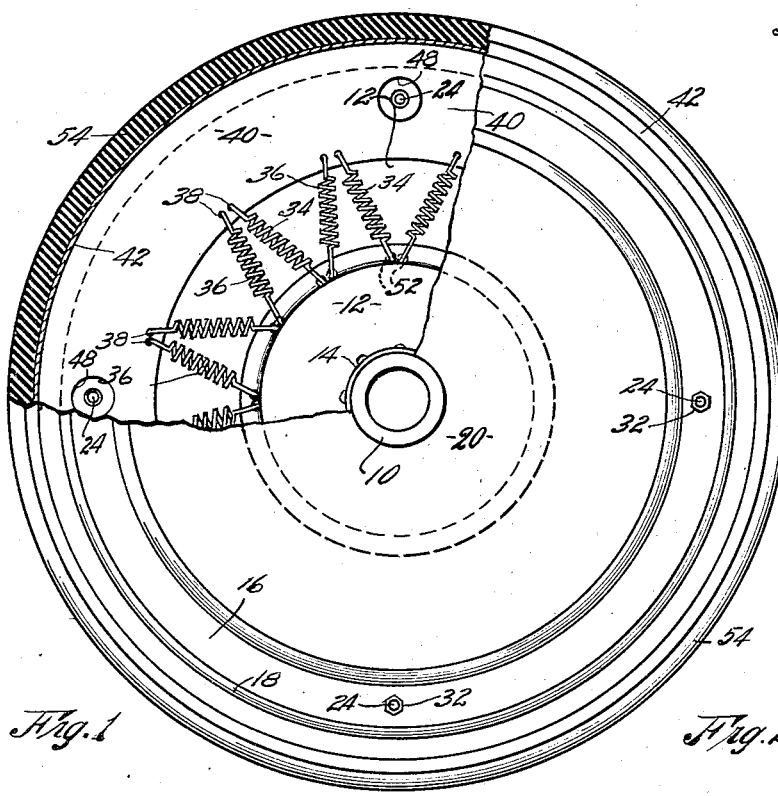
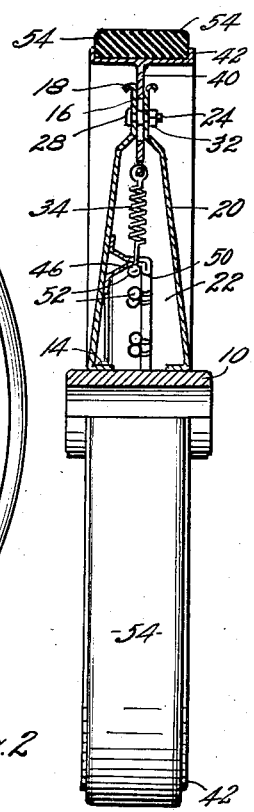
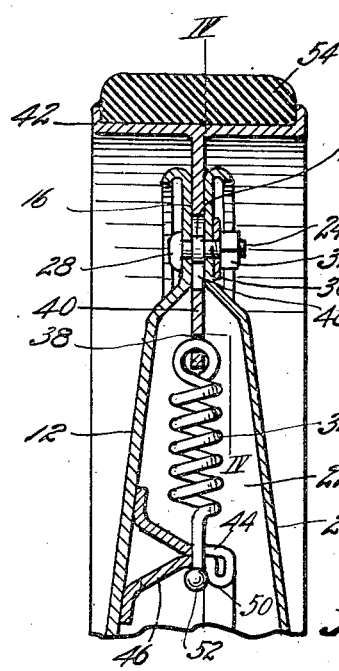
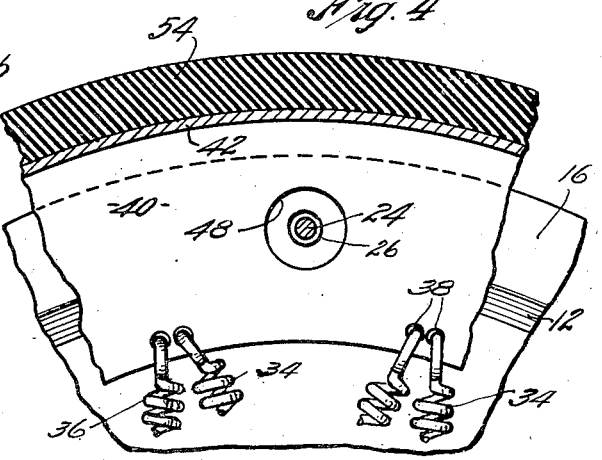
INVENTOR,
Thomas A. Purvis.
BY Roy E. Hamilton,
Attorney.

Patented Jan. 4, 1949

2,458,300

UNITED STATES PATENT OFFICE 2,458,300

RESILIENT WHEEL

Thomas A. Purvis, Tulsa, Okla., assignor of one-half to Joe Emil Hampton, Tulsa, Okla.

Application May 22, 1944, Serial No. 536,836

1 Claim. (Cl. 152—89)

This invention relates to improvements in vehicle wheels and has particular reference to a spring type disc wheel.

The principal object of the present invention is the provision of a resilient disc wheel provided with a pair of spaced apart discs between which is slidably mounted a radial flange of a rim for limited universal planar movement and resilient means whereby said rim is normally secured in substantially concentric relation to the wheel.

Another object of this invention contemplates the provision of a rim member adjustably mounted between two spaced apart discs and secured for resilient movement by means of a series of springs secured at their one end to said rim member and demountably secured at their other end to a ring member carried by one of said discs.

Other objects of this invention are simplicity and economy of construction, ease of assembly and the provision of the spring parts which are conveniently housed against the elements.

Reference will be had to the drawings wherein:

Fig. 1 is an elevational view partly broken away of a resilient wheel embodying this invention.

Fig. 2 is an edge view of the wheel shown in Fig. 1, with a portion in section and a portion in edge elevation.

Fig. 3 is an enlarged radial, sectional view showing the operating parts.

Fig. 4 is a sectional view taken on line IV—IV of Fig. 3.

Throughout the several views like reference characters refer to similar parts and the numeral 10 designates a hub of any conventional type suitable for receiving any of the various types of bearings, such as roller bearings, ball bearings, or plain bushing bearings for receiving the standard axle, not shown.

A radial disc 12 rigidly secured at 14 to hub 10 is dished as shown and provided with an outer planar flange 16 provided with a rolled edge 18. A removable disc 20 is constructed in like manner as disc 12 with the dished portion thereof in reverse position to present a compartment 22. These two discs are spaced apart at their outer planar extremities by means of bolts 24. These bolts are each provided with an enlarged section 26 which serves as a spacer between the discs 12 and 20 to hold them in fixed spaced apart relation. A riveted head 28 secures bolt 24 to the rigid disc 12 and the disc 20 is held in position by means of washer 30 and nut 32. By means of this type of fastening it is apparent that the disc 20 may be removed when it is desired to repair or otherwise work with the resilient mountings contained within the compartment 22.

A series of springs 34 disposed obliquely to the radial lines of the wheel are uniformly spaced apart about the wheel axle while the series of springs 36 are identical with springs 34, but are disposed at a similar angle relative to the radial line of the wheel but on the opposite side thereof. These springs 34 and 36 are mounted under tension with one end thereof secured through holes 38 formed through the radial flange 40 of the rim member 42, while the other ends thereof are secured in slots 44 formed in the annular bracket 46 carried concentrically of the wheel by disc 12. The flange 40 is adapted to have a sliding fit between the two discs 12 and 20. The enlarged portion 26 of bolt 24 is normally concentric with a circular opening 48 formed through flange 40, thus limiting the relative movement of the flange and discs in all directions. This limitation of relative movement of these parts precludes objectionable extension of the springs 34 and 36 beyond their elastic limit thereby insuring long life to these resilient members.

Referring to Fig. 3, it will be noted that ring bracket 46 is provided with an inturned flange 50 which serves to engage the enlarged head 52 formed on the inner end of spring 34 to prevent accidental dislodgment of the spring. During the insertion of the springs, it is apparent that when it is desired to mount the springs after their outer ends are attached to the flange 40, all that is necessary is to press the wheel toward the hub in line with the spring being mounted, then hook the inner end of the spring to position in slot 44. With the springs positioned in pairs and in angled relation to each other as shown, it is quite apparent that they not only function to receive the radial thrusts of the wheel but also serve to function as supporting means even though they are adjacent the horizontal central plane of the wheel.

A suitable thread member 54 is adapted to be mounted in the flanged rim member 42 and may be made of any suitable material depending in a large degree upon the use to which the wheel is to be put.

The dished discs 12 and 20 serve to absorb the side strain put on the outer periphery of the wheel and also serve to act as a securing guide whereby relative movement between the rim member and the hub construction of the wheel is facilitated. When replacement or changing of the spring members is required, the operator simply removes nuts 32, slides the disc 20 from its position on hub 10, thereby exposing the inner resilient working parts of the wheel. This removal of disc 20 does not in any way interfere with the mountings of the two sets of springs 34 and 36.

What I claim as new and desire to be secured by Letters Patent is:

In a vehicle wheel, a hub, a rim having a radially disposed central flange having relatively large circular holes formed therethrough, a disc secured rigidly to said hub, a removable disc slidably mounted on said hub and secured in fixed spaced apart relation to said first named disc by bolts passing through the central portion of said large circular holes of said rim whereby said rim has limited universal planar movement relative to said discs, a concentrically disposed annular bracket rigidly fixed to the inner face of said fixed discs, and having open slots formed in the edge thereof, and a plurality of helical springs disposed non-radially between said discs and secured at their outer ends to said flange and at their inner ends in the open slots formed in the edge of said annular bracket whereby the rim and hub are normally secured in substantially concentric relation.

THOMAS A. PURVIS.

REFERENCES CITED

The following references are of record in the file of this patent:

UNITED STATES PATENTS

| Number | Name | Date |
|---|---|---|
| 814,479 | Roddy | Mar. 6, 1916 |
| 849,849 | Morse | Apr. 9, 1907 |
| 1,054,118 | Hipkins | Feb. 25, 1913 |
| 1,063,359 | Langjahr | June 3, 1913 |
| 1,425,706 | Simmons | Aug. 15, 1922 |

FOREIGN PATENTS

| Number | Country | Date |
|---|---|---|
| 274,356 | Italy | 1930 |